United States Patent [19]

Kaya et al.

[11] Patent Number: 5,459,114
[45] Date of Patent: Oct. 17, 1995

[54] METHOD FOR PRODUCING CERAMIC PRODUCTS

[75] Inventors: Hiroshi Kaya; Kiyoshi Sato; Hiroki Morozumi; Atushi Tezuka; Tomoko Aoki; Hirohiko Nakahara; Tadashi Suzuki; Takeshi Isoda, all of Iruma, Japan

[73] Assignee: Tonen Corporation, Tokyo, Japan

[21] Appl. No.: 256,807

[22] PCT Filed: Nov. 26, 1993

[86] PCT No.: PCT/JP93/01730

§ 371 Date: Jul. 25, 1994

§ 102(e) Date: Jul. 25, 1994

[87] PCT Pub. No.: WO94/12448

PCT Pub. Date: Jun. 9, 1994

[30] Foreign Application Priority Data

Nov. 26, 1992 [JP] Japan .................................. 4-317510
Dec. 24, 1992 [JP] Japan .................................. 4-344309

[51] Int. Cl.⁶ ........................ C04B 35/58; C04B 35/80; C04B 41/87
[52] U.S. Cl. ........................ 501/96; 501/97; 501/98; 501/92; 106/287.11
[58] Field of Search ................... 501/92, 96, 97, 501/98; 106/287.11

[56] References Cited

U.S. PATENT DOCUMENTS

| | | | |
|---|---|---|---|
| 4,117,057 | 9/1978 | Yajima et al. | 264/63 |
| 4,460,638 | 7/1984 | Haluska | 428/224 |
| 4,656,300 | 4/1987 | Lebrun et al. | 556/412 |
| 5,139,717 | 8/1992 | Peuckert et al. | 264/60 |
| 5,176,941 | 1/1993 | Peuckert et al. | 427/226 |

FOREIGN PATENT DOCUMENTS

| | | |
|---|---|---|
| 62-11729 | 1/1987 | Japan . |
| 62-195024 | 8/1987 | Japan . |
| 63-81122 | 4/1988 | Japan . |
| 63-16325 | 4/1988 | Japan . |
| 63-191832 | 8/1988 | Japan . |
| 1138107 | 5/1989 | Japan . |
| 1138108 | 5/1989 | Japan . |
| 1203429 | 8/1989 | Japan . |
| 1203430 | 8/1989 | Japan . |
| 1305869 | 12/1989 | Japan . |
| 2-84437 | 3/1990 | Japan . |
| 2-77427 | 3/1990 | Japan . |
| 2188478 | 7/1990 | Japan . |
| 2188471 | 7/1990 | Japan . |
| 3-31326 | 2/1991 | Japan . |
| 3170533 | 7/1991 | Japan . |
| 4-63833 | 2/1992 | Japan . |
| 4-9169 | 2/1992 | Japan . |
| 4164923 | 6/1992 | Japan . |
| 4-46974 | 7/1992 | Japan . |
| 4242469 | 11/1992 | Japan . |
| 5-86200 | 4/1993 | Japan . |
| 5331293 | 12/1993 | Japan . |

OTHER PUBLICATIONS

Walker, B. F., Jr., et al, Ceramic Bulletin, 62(8) 916–923(1983) no month avail., "Preparation and Properties of Monolithic and Composite Ceramics Produced by Polymer Pyrolysis".

Fitzer, E. et al, Nippon Cermaics Society, 2008, 159(1988)no month avail."Composite Ceramics produced by Polymer Pyrolysis(1) Silazane System".

*Primary Examiner*—David Brunsman
*Attorney, Agent, or Firm*—Michael N. Meller

[57] ABSTRACT

Repetition of a process of impregnating a metal fiber or ceramic fiber preform or porous ceramic with (3) a mixture of polysilazane-type polymers with a number average molecular weight of 200–3000 and a viscosity adjusted to 100 Pa.s or lower at the impregnation temperature, prepared by mixing (1) one or more types of polysilazane-type polymers with a number average molecular weight of 200–3000 and a viscosity of less than 1 Pa.s at the impregnation temperature with (2) one or more types of polysilazane-type polymers with a number average molecular weight of 200–100,000 and having a viscosity of 1 Pa.s or higher or solid at the impregnation temperature, which are selected from polysilazanes whose main repeating unit is —[(SiH$_2$)$_n$(NH)$_r$]— (where n and r are 1, 2 or 3), and copolymers, modified polymers and crosslinked polymers based thereon, and performing crosslinking curing and then firing, is performed for its conversion into a ceramic. The above polysilazane may be, for example, an inorganic polysilazane, an inorganic polysiloxazane, a polyorgano(hydro)silazane, a modified polysilazane or a polymetallosilazane. By performing the CVD coating before or after said process of impregnation, curing and firing, delamination of the fibers may be minimized.

12 Claims, No Drawings

METHOD FOR PRODUCING CERAMIC PRODUCTS

This application is a filing under 35 U.S.C. 371 of PCT/JP93/01730 filed Nov. 26, 2993.

DESCRIPTION

Method for Producing Ceramic Products

TECHNICAL FIELD

The present invention relates to a method for producing ceramic products, and the ceramic products provided by the present invention include fiber reinforced ceramics and high density ceramics, which may be suitably used as structural materials in harsh environments of high temperature, corrosion, etc. More specifically, it relates to fiber reinforced ceramics made by reinforcing a silicon nitride-type matrix with metal or inorganic fiber, and to ceramic products which have been highly consolidated by impregnation into porous ceramics.

BACKGROUND ART

Ceramics have excellent heat resistance, corrosion resistance and heat insulating properties in comparison to metal materials, and thus they have received attention as structural materials in place of metals in harsh environments of high temperature, corrosion, etc. However, ceramics cannot be deformed in the same way as metal materials, and stress becomes concentrated on defects in the material and flaws on the surface to lead to easy breakage, giving them the disadvantage of poor fracture toughness. In order to improve this fracture toughness of ceramics, particles or fibers are dispersed in the matrix to absorb the rupture energy.

Methods for the production of fiber reinforced ceramics are largely classified into three types: powder sintering methods, CVD (CVI) methods and impregnation methods.

(1) In powder sintering methods, a reinforcing material such as whiskers or the like is mixed with powder which forms a matrix, and this mixture is sintered at a high temperature of 1600° C. or above. Since powder sintering requires high-temperatures to obtain a consolidated sintered body, its disadvantages include that it can only be used for a limited reinforcing materials.

(2) CVD (CVI) methods involve deposition of a ceramic matrix from a gaseous precursor into spaces in a preform, which is made of inorganic fibers, whiskers or the like. In the CVD (CVI) method, the substance which is to form the ceramic matrix may also be filled into fine pores, but a large number of pores are left as closed pores, and it is generally difficult to fill more than 80% of the pores. Other problems encountered include long production time, high production costs and difficulty of application to large-sized forms due to limits of the apparatuses.

(3) Impregnation methods involve impregnating a polymer which is converted into ceramic after heat treatment, into a preform made of inorganic fibers, whiskers or the like, and then firing it to form a matrix. By repeating the steps of impregnation and heating it is possible to obtain a more consolidated fired body, and this method may be applied to structures with complex shapes and to large-sized forms. In addition, because the firing is performed at a lower temperature than in powder sintering, there is no limit to the type of reinforcing material which may be used.

Ceramic composite materials prepared by thermal decomposition of a ceramic precursor polymer to obtain a matrix are found described in European Patent No. 0,125,722, U.S. Pat. No. 4,117,057 and U.S. Pat. No. 4,460,638. The drawback of these methods is that the polymer must be diluted to about 50% with an organic solvent for its impregnation into the preform. Since the polymer used is a solid or highly viscous liquid, it must be diluted with a solvent to adjust it to a viscosity suitable for impregnation. This solvent must be removed after the impregnation however, and therefore a drying process is necessary, and since pores are left after drying the resulting material has a low density and low strength.

A method designed to improve this is described in Japanese Unexamined Patent Publication (Kokai) No. 2-188471, in which method polysilazane is impregnated without dilution with a solvent. When liquid polysilazane is used, curing and infusibility treatment are necessary after impregnation in order to keep the shape of the product. In this method, the impregnated body is treated for infusibility in an atmosphere of ammonia, urotropin, amine, chlorosilane, or the like. However, when a gas is used in this manner for infusibility, a difference results in the composition of the outer and inner layers of the sample, with the outer layer being more consolidated and densified. Consequently, even if reimpregnation is attempted to improve the density, inner pores are brocked by a outer densified layer, thus lowering the efficiency of densification, and the strength of the final sample is lowered.

Furthermore, in Japanese Unexamined Patent Publication (Kokai) No. 1-305869 (French Patent No. 88 04546) there is described an alternative method of improving the impregnation efficiency, in which a polymerization catalyst is adsorbed onto a preform and then a matrix precursor is impregnated therein and polymerized. However, this method has two drawbacks, one being that the process is complicated and the other that it is required to add, in the form of the polymerization catalyst, an element which is not necessary in the final product and, depending on the case, also harmful.

In addition, there are examples of composite materials prepared using ceramic precursor polymers in K. Ueno, E. Fitzer, et al., *Proceedings of the 1988 Annual Meeting of the Nihon Ceramic Society*, p.158–159, (1988) and B. Walker, R. Rice, Ceramic Bulletin, p.916–923, 62, (1983), but neither of these provide products with sufficient strength.

As a method of producing fiber reinforced ceramics, the impregnation method has the advantages mentioned above, but also has the following disadvantages in regard to the polymers and steps employed, for which reasons fired bodies with high strength near the theoretical density cannot be obtained.

That is, the polymer preferably possesses the following, but there are no polymers which possess all of these requirement.

(i) The ceramic phase which is converted after heat treatment is heat-resistant, oxidation resistant and corrosion-resistant.

(ii) The ceramic yield is high in order to minimize repetition of the process.

(iii) It has a low viscosity for satisfactory impregnability, and a satisfactory wettability.

(iv) It is preferably a thermosetting polymer. This is for dimensional stability of the product, prevention of bubbling due to the generation of cracked gas, and defects resulting therefrom, and elimination of the time-consuming infusibility treatment.

Many gaps may remain after repeated impregnation and firing steps and these lower the strength of the product.

Here, it is the first object of the present invention to improve a polymer suited for the production of fiber reinforced ceramics, and to provide a method for producing high-strength, fiber reinforced ceramics by adding improvements to each of the steps in the impregnation method.

In addition, since ceramic materials are superior for their mechanical properties such as high strength, oxidation resistance, etc., their development as high-temperature materials has been increasingly promoted. However, in the conventional methods the dispersing agents and bonding agents used for molding are scattered during sintering and therefore many gaps appear.

(1) A method has been proposed for achieving greater consolidation by coating an inorganic polysilazane onto the surface of a porous ceramic obtained by a conventional method. The coating of the polysilazane is fired under inert or oxygen-containing atmosphere. This coating prevents the penetration of high-pressure gas into the interior of the porous body under HIP treatment. In this method, the degree of polymerization of the polysilazane is specified to 6–25, in order to form a uniform film on the surface of the porous body.

(2) A method has been proposed for achieving greater consolidation by using a liquid high molecular ceramic precursor as a dispersing agent or bonding agent and converting the ceramic precursor into a ceramic. In order to disperse the ceramic precursor uniformly and minimize the loss of evaporation and decomposition, the viscosity of the precursor is specified at 10,000–1 poise. To obtain further consolidation, the repetition of the impregnation of the precursor is performed.

Nevertheless, the method (1) involves a complicated process. Because of HIP treatment, it cannot be applied to objects with complex shapes.

The method (2) uses an organic-type precursor, which has much weight loss and many free carbon after decomposition, which lower he mechanical strength and properties.

Generally speaking, a more consolidated ceramic material may be obtained by filling the gaps by repeating impregnation and firing with a preceramic polymer. And this may be applied to structures with complex shapes and large-sized forms. Although the impregnation method has such advantages, for obtaining high-density and high-strength, it is necessary to select the polymer to be used and strictly control the steps sintered body.

Here, it is the second object of the present invention to improve a polymer suited for the production of high-density ceramics by the impregnation method, and to provide a method for producing high-strength, fiber reinforced ceramics by adding improvements to each of the steps in the impregnation method.

DISCLOSURE OF THE INVENTION

In order to achieve the above mentioned objects, the present invention provides a method for producing ceramic products which is characterized by impregnating a metal fiber or ceramic fiber preform or a porous ceramic with a substance comprising one or more types of polysilazane-type polymers selected from A–P below, with a number average molecular weight of 200–3000 and a viscosity of 100 Pa.s or lower at the impregnation temperature, and performing crosslinking curing and then firing for its conversion into a ceramic. As well as the present invention provides a method for producing ceramic products which is characterized by impregnating a metal fiber or ceramic fiber preform or a porous ceramic with (3) a mixture of polysilazane-type polymers with a number average molecular weight of 200–3000 and a viscosity adjusted to 100 Pa.s or lower at the impregnation temperature, said mixture being prepared by mixing (1) one or more types of polysilazane-type polymers with a number average molecular weight of 200–3000 and a viscosity of less than 1Pa.s at the impregnation temperature with (2) one or more types of polysilazane-type polymers with a number average molecular weight of 200–100,000 and having a viscosity of 1 Pa.s or higher or solid at the impregnation temperature, said polymers (1) and (2) are selected from the polymers A–P below, and performing crosslinking curing and then firing the polymer mixture, for its conversion into a ceramic.

A) A polysilazane whose main repeating unit is —[(SiH$_2$)$_n$(NH)$_r$]— (where n and r are 1, 2 or 3).

B) A polysiloxazane whose main repeating units are —[(SiH$_2$)$_n$(NH)$_r$]— and —[(SiH$_2$)$_m$O]— (where n, m and r are 1, 2 or 3).

C) A polyorgano(hydro)silazane represented by the compositional formula (RSiHNH)$_x$ [(RSiH)$_{1.5}$N]$_{1-x}$ (where each R independently represents an alkyl, alkenyl, cycloalkyl, aryl, alkylsilyl, alkylamino, alkylhydrazine or alkoxy group, and 0.4<x<1).

D) A polysilazane whose main repeating units are —[(SiH$_2$)$_n$(NH)$_r$]— and [(SiR'H)$_n$(NR')$_r$]— (where R' may be the same or different and is a hydrogen atom or the same as R above, and n and r are 1, 2 or 3).

E) A polysilazane whose main repeating units are —SiH(N<)$_2$— and —[(SiR'H)$_n$(NR')$_r$]— (where R' may be the same or different and is a hydrogen atom or the same as R above, and n and r are 1, 2 or 3).

F) A modified polysilazane obtained by reacting the polysilazane in A above with an alkylamine, alkylsilazane or alkylaminosilane represented by (R$^1$)$_2$NH [where each R$^1$ is independently an alkyl group or (R$^2$)$_3$Si— (where each R$^1$ is independently an alkyl group or hydrogen, provided that at least one is not hydrogen)].

G) A modified polysilazane obtained by reacting the polysilazane in A above with an alcohol, organic acid, ester, ketone, aidehyde, isocyanate, amide or mercaptan.

H) A silazane high polymer obtained by further crosslinking and branching the polysilazane in A above, wherein the ratio of —SiH$_2$ groups and —SiH$_3$ groups per molecule is 2.5–8.4.

I) A polymetallosilazane obtained by reacting a polysilazane whose main repeating unit is represented by —Si(R$^3$)$_2$NR$^3$— (where each R$^3$ is independently a hydrogen atom or the same as R above, provided that at least one R$^3$ is hydrogen), with a metal alkoxide represented by M(OR$^4$)$_m$ (where M is an element selected from the group consisting of elements from Groups IIA to VA and elements from Groups IIB to VB of the Periodic Table, each R$^4$ independently represents a hydrogen atom, an alkyl group of 1–20 carbon atoms or an aryl group provided that at least one R$^4$ is not a hydrogen atom, and m is the valency of M.).

J) A polyborosilazane whose main repeating units are —[(SiH$_2$)$_n$(NH)$_r$]— (where n and r are 1, 2 or 3) and —B(N<)$_2$.

K) A polyborosilazane whose main repeating unit is represented by —Si(R$^3$)$_2$NR$^3$— (where R$^3$ is the same as above), and which has a crosslinked bond

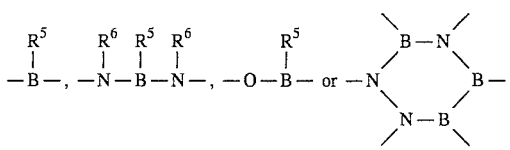

(where each $R^5$ is independently a hydrogen atom, halogen atom or a $C_1$ to $C_{20}$ alkyl, alkenyl, cycloalkyl, aryl, alkoxy, alkylamino, hydroxyl or amino group, $R^6$ is a residue bonded to the nitrogen atom of a nitrogen atom-containing $R^5$ group, and in the last chemical formula at least 2 of the total of 6 atoms consisting of 3 nitrogen atoms and 3 boron atoms are used for crosslinking, while $R^5$ may be bonded to the remaining atoms).

L) A polyphosphosilazane whose main repeating unit is represented by $-Si(R^3)_2NR^3-$ (where $R^3$ is the same as above), and which has a crosslinked bond

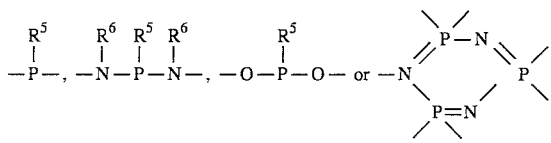

(where $R^5$ is the same as described above, $R^6$ is a residue bonded to the nitrogen atom of a nitrogen atom-containing $R^5$ group, and in the last chemical formula at least 2 of the bonding sites are used for crosslinking, while $R^1$ may be bonded to the remaining atoms).

M) A thermosetting copolymer prepared by copolymerizing a polysilazane whose main repeating unit is $-[(SiH_2)_n(NH)_r]-$ (where n and r are 1, 2 or 3) with a thermoplastic silicon-containing polymer.

N) A thermosetting copolymer prepared by copolymerizing the reaction product of a polysilazane whose main repeating unit is $-[(SiH_2)_n(NH)_r]-$ (where n and r are 1, 2 or 3) and a metal compound, with a thermoplastic silicon-containing polymer.

O) A thermosetting copolymer prepared by copolymerizing the polyborosilazane described in I, J or K above with a thermoplastic silicon-containing polymer.

P) A copolymer of any of the above mentioned polymers.

Best Mode for Carrying Out the Invention

If the starting material is a metal fiber or ceramic fiber preform then a fiber reinforced ceramic may be obtained, and if the starting material is a porous ceramic then a high-density ceramic may be obtained.

For the production of a fiber reinforced ceramic, the material of the reinforcing fiber is, in the case of a ceramic material, a heat resistant ceramic composed mainly of carbon, silicon carbide, silicon nitride, silicon carbonitride, silicon oxynitride, alumina, mullite, silica, zirconia, boron nitride, aluminum nitride, boron, potassium titanate or the like; and in the case of a metal material, a high-melting point metal such as tungsten, molybdenum, tantalum, niobium, etc., a heat resistant nickel-based alloy such as inconel, etc. or an iron-based alloy such as steel, stainless steel, etc. As ceramic fibers, carbon, silicon carbide and silicon nitride fibers are particularly preferred from the point of view of heat resistance and creep resistance. As metal fibers, tungsten, molybdenum and tantalum fiber are preferred for their heat resistance.

Furthermore, the fibers are preferably continuous fibers if the purpose is high strength. On the other hand, if moldability is of primary importance, the use of chopped fibers $10^{0}$ cm–$10^{0}$ mm in length, milled fibers $10^{2}$–$10^{1}$ μm in length and short fibers such as whiskers, is preferred.

The preform to serve as the aggregate for the reinforcing fibers is prepared by the method described below.

In the case of milled fibers and short fibers such as whiskers, the preform is prepared by dry press molding or a wet molding method such as slip casting. In the case of chopped fibers, they are kneaded with an appropriate organic binder and press molded. In the case of unidirectional continuous fibers, the preform is prepared by the filament winding method wherein the fibers are wound on a drum. If they are bidirectional it is prepared by laminating a woven fabric or unidirectional material. A multidimensional fabric may also be used.

The surface of the continuous fibers, chopped fibers or milled fibers may be coated with carbon and/or one or more of the ceramics described hereunder. Also, high-melting-point metals such as Ta, Mo and W, precious metals such as Pt and cermets such as TiC-Ni and Wc-Co are sometimes useful. The coating allows control of the interface between the fibers and the matrix, the composite material ruptures in a pseudo-plastic manner, and thus the strength and rupture energy may be sometimes improved. The thickness of the coating film is 100 μm or less, and 10 μm or less is preferred from the viewpoint of ease of handling. Furthermore, it is sometimes effective to cover the surface of a woven fabric, fabric or the like which has uncoated fibers, with carbon, a ceramic or a metal/cermet similar to the surface coating of the above mentioned fibers. In general, the surface coating allows control of the interface between the reinforcing fibers and the matrix, and sometimes the rupture mode changes from brittle to non-brittle (pseudo-plastic) to exhibit high strength.

These ceramic compositions of coating may deviate from the stoichiometric ratio, and in such cases non-metallic elements such as boron, carbon and oxygen may be included, which are not included as structural elements.

Specific examples of various ceramics are given below.

① Carbides: Silicon carbide, titanium carbide, zirconium carbide, vanadium carbide, chromium carbide, tungsten carbide, beryllium carbide, boron carbide, and other carbides.

② Nitrides: Silicon nitride, titanium nitride, zirconium nitride, vanadium nitride, beryllium nitride, boron nitride, aluminum nitride, and other nitrides.

③ Oxides: Alumina, silica, magnesia, zirconia, titania, mullite, cordierite, yttria, borate glass, high-silica-containing glass, silicon oxynitride, sialon, and other oxides.

④ Silicides: Iron monosilicide, triboro monosilicide, hexaboro monosilicide, dimagnesium monosilicide, manganese monosilicide, cobalt silicide, divanadium monosilicide, and other silicides.

⑤ Borides: Chromium boride, tungsten boride, titanium boride, molybdenum boride, nickel boride, dimolybdenum boride, ditungsten boride, tetraborocarbide, diborotrioxide, and other borides.

Also, as examples of methods for carrying out this coating there may be mentioned the plasma flame coating method, the CVD method, the precursor coating method, etc.

In the plasma flame coating method, a commercially available plasma flame coating apparatus and flame coating powder are used to allow to easily formation of an inorganic coating.

In CVD, a ceramic matrix metal composite is heated, and a reactive gas is supplied onto the surface thereof to deposit an inorganic layer on the surface, thus providing a coating. The inorganic layer to be deposited may be SiC, $Si_3N_4$, BN, $B_4C$, TiC, TiN or the like.

The precursor coating method involves application of a sol-gel solution prepared from a ceramic precursor polymer such as a polysilazane, polysiloxazane, polycarbosilane, polysilastylen etc. or a metal alkoxide, onto a composite material, followed by firing to obtain an inorganic coating of a non-oxide or oxide. Examples of the former include $Si_3N_4$, BN, SiC, etc. and examples of the latter include $Al_2O_3$, mullite, $TiO_2$, etc.

Furthermore, when producing high-density ceramics, the porous ceramic to be impregnated is not particularly limited, and any one may be appropriately used so long as it is a ceramic sintered body obtained by sintering ceramic powder.

In addition, when producing either fiber reinforced ceramics or high-density ceramics, it is effective to add powder or whiskers of the various ceramics in ①–⑤ above to the above mentioned mixed polymers (3), but the effect is greater for the former. That is, when adjusted to a low viscosity, the mixed polymer for impregnation oozes from the preform, and thus the consolidation is sometimes inadequate. Particularly, it is effective for two-dimensional and three-dimensional fabrics having a low fiber volume $V_f$, and poor opening, etc.

Here, polysilazanes whose main repeating unit is —[$(SiH_2)_n(NH)_r$]— are inorganic polysilazanes with no organic groups on side chains. Particularly preferred is an inorganic polysilazane synthesized by reacting an adduct of a dihalosilane and a base with ammonia (Japanese Examined Patent Application (Kokoku) No. 63-16325, Japanese Unexamined Patent Application (Kokai) No. 3-170533). This inorganic polysilazane includes a ringed or branched structure having the above mentioned repeating unit, but it is mainly a linear polymer, and it is very highly reactive.

A polysiloxazane whose main repeating units are —[$(SiH_2)_n(NH)_r$]— and —[$(SiH_2)_mO$]— which is produced by reacting an adduct of a dihalosilane and a base with ammonia and water or oxygen (Japanese Unexamined Patent Application (Kokai) No. 62-195024) is suitable, and it has the same structure as an inorganic polysilazane. Therefore, this polysiloxazane may also be a polycondensed high polymer form of a mainly linear polymer.

A polyorgano(hydro)silazane represented by the compositional formula $(RSiHNH)_x [(RSiH)_{1.5}N]_{1-x}$ has a structure wherein a hydrogen atom and organic base are bonded to a silicon atom. For this type of polyorgano(hydro)silazane there may be appropriately used, as in the case of the inorganic polysilazane, the product of a reaction between ammonia and an adduct of an organo(hydro)dihalosilane and a base, and this also includes high polymers resulting from polycondensation and the like (Japanese Examined Patent Application (Kokoku) Nos. 4-9169 and 4-46974).

A polysilazane whose main repeating units are —[$(SiH_2)_n(NH)_r$]— and [$(SiR'H)_n(NR')_r$]— (where R' may be the same or different and is a hydrogen atom or the same as R above, and n and r are 1, 2 or 3) is one type of copolymer of an inorganic polysilazane and an organic polysilazane, but the repeating units may be irregularly distributed (Japanese Unexamined Patent Application (Kokai) No. 3-170533). A polysilazane whose main repeating units are —$SiH(N<)_2$— and —[$(SiR'H)_n(NR')_r$]— (where (where R' may be the same or different and is a hydrogen atom or the same as R above, and n and r are 1, 2 or 3) may also be produced by the same type of copolymerization (Japanese Unexamined Patent Application (Kokai) No. 3-31326).

The production is effected by a dehydropolycondensation reaction of ammonia or hydrazine, or a compound made by substituting their hydrogens with R' (organic groups), with an inorganic polysilazane under basic conditions. Because nitrogen atoms are incorporated in the polymer in the form of crosslinked bonds, the ratio of nitrogen atoms to silicon atoms (N/Si) is greater than in the original polymer, and closer to the stoichiometric ratio of silicon nitride (Japanese Unexamined Patent Application (Kokai) Nos. 1-138107, 1-203429, 1-203430, and 4-63833).

There may also be used a modified polysilazane obtained by reacting an inorganic polysilazane with an alcohol, organic acid, ester, ketone, aldehyde, isocyanate, amide or mercaptan (Specification of Japanese Patent Application No. 3-320167).

The inorganic polysilazane may also be a highly polymerized polysilazane obtained by a polycondensation reaction or the like using heat. With such a high-polymer-type inorganic polysilazane, branching is promoted by the polycondensation reaction and the ratio of $SiH_3$ groups to $SiH_2$ groups ($SiH_3$ groups/$SiH_2$ groups) per molecule increases to over twice the original ratio, i.e. 2.5–8.4, and its solubility in solvents is improved. This polymer is generally 50–70 wt% Si, 20–34 wt% N and 5–9 wt% H (Japanese Unexamined Patent Application (Kokai) No. 1-138108).

A metal may be incorporated into the polysilazane, and this may be achieved by reacting a polysilazane whose main repeating unit is represented by —$Si(R^3)_2NR^3$— (where each $R^3$ is independently a hydrogen atom or the same as R above, provided that at least one $R^3$ is hydrogen), with a metal alkoxide represented by $M(OR^4)_m$ (where M is an element selected from the group consisting of elements from Groups IIA to VA and elements from Groups IIB to VB of the Periodic Table, each $R^4$ independently represents a hydrogen atom, an alkyl group of 1–20 carbon atoms or an aryl group provided that at least one $R^1$ is not a hydrogen atom, and m is the valency of M.). Since this polymetallosilazane contains a metal, its advantages include excellent affinity with metals and excellent heat resistance when made into a ceramic (Japanese Unexamined Patent Application (Kokai) Nos. 63-81122, 63-191832 2-77427 and 2-84437).

A polyborosilazane whose main repeating unit is represented by —$Si(R^3)_2NR^3$— (where each $R^1$ is independently a hydrogen atom or the same as R above), and which has a crosslinked bond

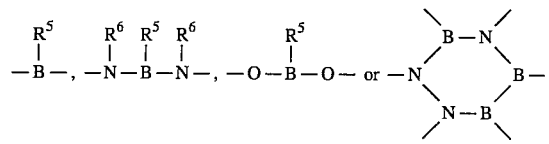

(where $R^5$ and $R^1$ are the same as described previously) is the product of a reaction between a polysilazane and a boron compound such as one of the ones shown below (Japanese Unexamined Patent Application (Kokai) No. 2-84437). Polyborosilazane has improved heat resistance when made into a ceramic because it contains boron.

-continued

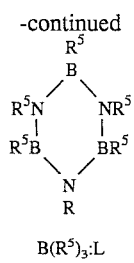

$B(R^5)_3 \cdot L$ (where $R^1$ is the same as described previously, and L is a compound which forms a chelate with $B(R^5)_3$).

In addition, the polyborosilazane may be one whose main repeating units are $-[(SiH_2)_n(NH)_r]-$ (where n and r are 1, 2 or 3) and $-B(N<)_2$, and this polyborosilazane may be synthesized by reacting a coordination compound obtained by reaction of a dihalosilane and trihalosilane with a Lewis base, with ammonia (Japanese Patent Application No. 2-412270).

A polyphosphosilazane obtained by adding phosphorus to the boron of a polyborosilazane, whose main repeating unit is represented by $-Si(R^3)_2NR^3-$ (where each $R^3$ is independently a hydrogen atom or the same as R above), and which has a crosslinked bond

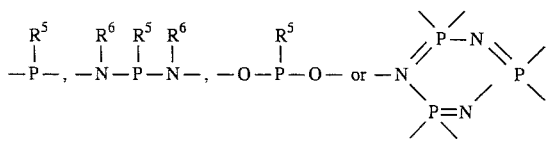

(where $R^5$ and $R^6$ are the same as described previously), is the product of a reaction between a polysilazane and a phosphoric compound such as one of the ones shown below, and it is equally effective (Japanese Unexamined Patent Application (Kokai) No. 4-164923).

$P(R^3)_3$ $[(R^5)_2PN]_x$ $P(R^5)_5$ $P_2O_5$ $OP(R^5)_3$ (where $R^5$ is the same as described previously).

A thermosetting copolymer prepared by copolymerizing a polysilazane whose main repeating unit is $-[(SiH_2)_n(NH)_r]-$ (where n and r are 1, 2 or 3) with a thermoplastic silicon-containing polymer, or a thermosetting copolymer prepared by copolymerizing the reaction product of a polysilazane whose main repeating unit is $-[(SiH_2)_n(NH)_r]-$ (where n and r are 1, 2 or 3) and a metal compound, with a thermoplastic silicon-containing polymer, provides a silicon carbide-type ceramic when fired (Specification of Japanese Patent Application No. 3-148687).

Also, a thermosetting copolymer prepared by copolymerizing the above mentioned polyborosilazane with a thermoplastic silicon-containing polymer provides a boron-containing silicon carbide-type ceramic when fired (Specification of Japanese Patent Application No. 4-138885).

The various copolymers of each of the above polymers include, in addition to those whose repeating units are irregularly arranged, copolymers such as block copolymers, branched copolymers, and the like.

Polymers which are mixtures of the polysilazanes in A–P above have the following characteristics which make them suitable for the impregnation method.

(1) They are converted by heat treatment into silicon nitride-type ceramics with excellent heat resistance.

(2) Their ceramic yield is very high. The ceramic yields of inorganic polysilazanes and inorganic polysiloxazanes are particularly high.

(3) Because they contain active SiH, $SiH_2$, $SiH_3$, NH, $NH_2$, OR groups and the like, their crosslinking curing occurs with heat treatment at low temperatures.

Polymers which are mixtures of the polysilazanes in A–P have these characteristics which make them basically suited for the impregnation method, but the following study and improvements were added to obtain satisfactory composite materials.

Methods of impregnating polymers into preforms or porous ceramics include vacuum impregnation and pressure impregnation, and according to the present invention a method has been employed wherein vacuum impregnation is followed by pressure impregnation. For vacuum impregnation it is necessary to set the conditions for virtually complete filling of the polymer into the gaps of the preform. This is in order to prevent bubbling and cracking during the curing and firing by escaping gas which persists after the vacuum deairing, and to eliminate the need for a high pressure during the pressure impregnation. Also, the use of a vacuum bag during low-pressure impregnation is useful from the standpoint of applicability to products with complex shapes, reduction of the amount of polymer used, etc.

In order to determine the conditions of the vacuum impregnation for virtually complete filling of the polymer into the gaps of the preform or porous ceramic within an appropriate time, various studies were made and it was found that a satisfactory state of impregnation is obtained if the viscosity and molecular weight of the polymer used are within the following ranges.

Viscosity: 100 Pa.s or lower, and preferably 1 Pa.s or lower.

Number average molecular weight: 3000–200, and preferably 1500–400.

If the viscosity and molecular weight of the polymer are within these ranges, then a satisfactory state of impregnation may be achieved under conditions of an impregnation temperature of 0°–400° C., a vacuum impregnation time of 1–10 hours, and a pressure (pressure: 0.5 kg/cm² G or higher) impregnation time of 0.1–10 hours. Polysilazanes with a number average molecular weight of less than 200 exhibit high evaporation loss in a vacuum even at close to normal temperature, and thus they are not desirable for application in the vacuum impregnation method.

The crosslinking curing of the polysilazane is promoted by heating and accompanied by the generation of hydrogen, ammonia, etc., and consequently the crosslinking curing must be completed while minimizing both the generation of bubbles due to escaping gas and cracking in the sample. Methods of curing were studied with the object of minimizing the generation of bubbles and cracking in the sample, and it was found that a crosslinked cured product with no bubbles may be stably obtained by heating at a temperature of 50°–400° C. while applying a pressure of 0.5 kg/cm² G or greater using an inert gas, nitrogen gas, ammonia gas or a mixture of these gases. The temperature-elevating rate here is preferably 100° C./min or less.

A disadvantage of polysilazanes with a low viscosity and low molecular weight suitable for impregnation is the low ceramic yield due to the volatility of part of the low molecular weight components during thermal decomposition. When the heat firing is conducted at atmospheric pressure, the ceramic yield in the case of inorganic polysilazanes is about 90% or more if the molecular weight is 2000 or greater, but it is reduced to about 80% or less if the molecular weight is 1000 or lower. However, by employing the method of crosslinking curing under pressurized conditions, even if a low molecular weight polysilazane is used its volatile low molecular weight components are fixed and hence it is possible to achieve a high ceramic yield. Furthermore, by mixing a low molecular weight polymer (1) and a small amount of a high molecular weight polymer (2) and adjusting the viscosity and molecular weight of the resulting mixture (3) to within the above mentioned ranges, the ceramic yield may be dramatically increased above what is expected for the mixing ratio without any reduction in the impregnation efficiency. And it is particularly effective for filling the polymer into the preform gaps during the initial steps of the repeated impregnation-curing-firing treatment.

The viscosity and molecular weight of the low molecular weight polymer (1) are within the following ranges.

Viscosity: 100 Pa.s or lower, and preferably 1Pa.s or lower.

Number average molecular weight: 3000–200, and preferably 1500–400.

The viscosity and molecular weight of the high molecular weight polymer (2) are within the following ranges.

Viscosity: 1Pa.s or higher, or solid.

Number average molecular weight: 100,000–200, and preferably 10,000–1000.

The polysilazane to be used according to the present invention is thermosetting and has no melting point or softening point, and since curing treatment is employed under pressurized conditions, the problems associated with impregnation methods, namely dimensional stability of the product, bubbling due to the generation of cracked gas, and defects resulting therefrom, and infusibility treatment, etc., are overcome.

After impregnation and crosslinking curing, firing is performed to make the ceramic.

There are no particular restrictions on the firing conditions, and the firing may be carried out at 600°–2000° C. either in an atmosphere of an inert gas, nitrogen, ammonia, hydrogen, oxygen, a hydrocarbon, carbon monoxide, or the like or a mixture thereof, or in a vacuum. The temperature-elevating rate during firing is preferably 500° C./min or less. The firing atmosphere is selected depending on the polysilazane and the reinforcing fibers used. In the case of a polysilazane consisting of only Si and N, a mixture of nitrogen, ammonia and hydrogen is preferred for the atmosphere, and if it contains oxygen as in the case of a polysiloxazane, the atmosphere preferably contains oxygen. If the reinforcing fibers are carbon fibers or metal fibers, the atmosphere is preferably an inert gas or nitrogen, or a reducing atmosphere which contains a hydrocarbon, carbon monoxide or the like, and more preferably a vacuum. In the case of silicon nitride fibers, it is preferably a nitrogen or ammonia atmosphere, and in the case of silicon carbide fibers it is preferably an inert gas or a vacuum.

The process of impregnation, crosslinking curing and conversion into a ceramic is repeated 2 or more times as necessary.

The polymer to be used in the method according to the present invention is characterized by maintaining a mainly amorphous state even after conversion into a ceramic by firing at temperatures up to 1200°–1700° C., and thus it forms a ceramic matrix with excellent high-temperature strength.

The composite material obtained by impregnation, curing and conversion into a ceramic in this manner is still insufficiently dense, and therefore the steps of impregnation, curing and conversion into a ceramic are repeated to make a composite material or ceramic with the desired degree of density and strength.

Methods of impregnation include, in addition to the present method of impregnating/firing a liquid polymer, a method in which a solid polymer is dissolved in a solvent and then impregnated/dried/fired. Here, it was attempted to apply this method to solid polysilazanes of molecular weight 3000 and greater, but for satisfactory impregnation it was necessary to dilute the polymer to about 70 wt% with an organic solvent such as xylene, and the following drawbacks were encountered.

(i) Since during vacuum impregnation the pressure cannot be made to lower than the vapor pressure of xylene (about 10 mmHg), the impregnation is incomplete.

(ii) The organic solvent must be removed prior to the firing, and much time is required for this drying step.

(iii) Since the impregnation solution contains a large amount of the organic solvent, the result is a poor impregnation efficiency.

Consequently, in order to obtain a fired body as dense as one obtained by the method for impregnating liquid polymers, it was necessary to repeat the process almost twice as many times.

As mentioned above, by the method according to the present invention, a polymer suited for the production of fiber reinforced ceramics is modified and the steps of impregnation are also improved, thus making it possible to obtain high-strength fiber reinforced ceramics; however, for special uses it is necessary to produce fiber reinforced ceramics with even higher strength and greater reliability, in which cases it is important to minimize delamination of the reinforced preform. This object is achieved by providing high-density fiber reinforced ceramics (composite materials) which are close to the theoretical density and have no delamination, as a result of the combination of CVD coating of the porous surface of the preforms and repeated impregnation/curing/firing of the various optimized polysilazane-type polymers, as according to the present invention.

For increased strength and reliability of fiber reinforced ceramics it is important to prevent delamination, and for the prevention of delamination it is sometimes effective to use a three-dimensional preform in which the reinforcing fibers are used in the direction in which the layers are joined. However, at present the types of fibers which may be used are limited from the standpoint of manageability of the filaments, and their shapes, Vf, etc. are also restricted. In contrast, the production of composite materials by 0°/90° layering of two-dimensional preforms and UD preforms such as plain weaves, satin, and the like is generally performed. However, such composite materials are disadvantaged by lower strength due to delamination.

Nevertheless, according to the present invention CVD (CVI) coating onto the porous surface of the preform joins the layers, and this was found to be effective for the prevention of delamination.

This CVD coating may be carried out as pretreatment prior to the impregnation, crosslinking curing and making into a ceramic using one of the above mentioned polysilazanes, or it may be carried out during the impregnation, crosslinking curing and making into a ceramic. However, it is more effectively carried out as a pretreatment considering protection of the reinforcing fiber interface in the preform, the slow speed of CVD coating, the difficulty of wraparound in the pores of the preform, etc.

The depositing capacity of the pores by the above mentioned CVD coating of the porous surface is preferably 2% or greater, and more preferably 10% or greater of the total porous volume. If the depositing capacity is too low, the bonding between the layers by CVD will be insufficient, and it will sometimes be impossible to prevent delamination. Also, because the rate of deposition is slow, and considering the efficiency of deposit in the preform, the treatment time, etc., for greater efficiency the depositing capacity is preferably 80% or less, and more preferably 70% or less of the porous volume. The fill volume factor of fiber preforms is not limited, but it is generally about 30–65%. This fiber volume ratio of 2–80%, and preferably 20–70% with respect to the remaining porous volume is CVD-coated, and polysilazane is impregnated into the remainder to make the ceramic.

The preferred ceramics to be used as the CVD coating material for achieving the object of the present invention must be capable of securing fibers and must be unreactive with the fibers, and specific examples thereof are given below.

(1) Carbides: Silicon carbide, titanium carbide, zirconium carbide, vanadium carbide, chromium carbide, molybdenum carbide, tungsten carbide, beryllium carbide, boron carbide, and other carbides.

(2) Nitrides: Silicon nitride, titanium nitride, zirconium nitride, vanadium nitride, beryllium nitride, boron nitride, aluminum nitride, and other nitrides.

(3) Oxides: Alumina, silica, magnesia, zirconia, titania, mullite, cordierite, yttria, borate glass, high-silica-containing glass, aluminosilicate glass, silicon oxynitride, sialon, and other oxides.

(4) Silicides: Iron monosilicide, triboro monosilicide, hexaboro monosilicide, dimagnesium monosilicide, manganese monosilicide, cobalt silicide, vanadium monosilicide, and other silicides.

(5) Borides: Chromium boride, tungsten boride, titanium boride, molybdenum boride, nickel boride, dimolybdenum boride, ditungsten boride, tetraborocarbide, diborotrioxide, and other borides.

(6) Other: Carbon

According to the present invention, the above ceramic materials may be used either alone or with two or more thereof in combination. The CVD method may be thermal CVD (CVI) under reduced pressure, normal pressure or intermittence, or plasma or photo CVD. However, under the present conditions, considering the binding strength between the layers of the preform by the coating film, wraparound in the pores of the preform, the rate of deposition, etc., thermal CVD, and particularly CVI (chemical vapor impregnation) is most effective.

If the surface of the preform is uncoated prior to this CVD coating, then molding using a thermosetting resin may be effected and followed by carbonization, to impart thereto a surface coating and shape retention.

The thermosetting resin used may be an epoxy, phenol, furan, urea, melanin, polyimide, polyphenylene, unsaturated polyester, diallyl phthalate, silicon resin or the like.

According to the present invention there is provided a method for producing consolidated ceramic products with few gaps, which may be applied to complex shapes and large-sized forms. The polysilazane to be used according to the present invention has a low viscosity and is suitable for impregnation, and also has a high rate of conversion into ceramics with excellent heat-resistance, oxidation-resistance, mechanical strength, etc., and thus dense, high-strength ceramic products (ceramic bodies and fiber reinforced ceramics) may be obtained. Furthermore, by combining the above mentioned impregnation and ceramic conversion of the polysilazane with CVD treatment of the surface of the preform, dense fiber reinforced ceramics with no delamination and with higher strength may be obtained.

EXAMPLES

Reference Example 1 (Method of preparing inorganic polysilazane)

A reactor placed in a constant-temperature bath at 0° C. was substituted with dry nitrogen, and then 4.5 liters of dry pyridine was placed therein and kept until the temperature became constant, after which 505.0 g of dichlorosilane ($SiH_2Cl_2$) was added thereto while stirring, to obtain a white solid adduct. The reaction mixture was cooled to 0° C., and 360 g of dry ammonia was blown in while stirring.

After completion of the reaction, dry nitrogen was blown in to remove the unreacted ammonia, and then pressure filtration was performed in a nitrogen atmosphere to obtain 4.5 liters of a filtrate. To this filtrate was added 5.0 liters of dry o-xylene and the solvent was removed under reduced pressure to make a volume of about 4.5 liters, after which an additional 5.0 liters of dry o-xylene was added thereto and distillation under reduced pressure was effected again to obtain 3.5 liters of the solution. A portion of the solution was separated off and the solvent was again removed under reduced pressure, upon which a colorless, viscous liquid was obtained.

The molecular weight of this viscous liquid was determined by GPC, and the number average molecular weight (Mn) was found to be 902. The viscosity was 75 mPa.s at 25° C.

Also, the elemental composition (wt%) of the above polymer was Si:64.3, N:26.8, O:1.9, C:2.6.

Reference Example 2 (Method of preparing modified polysilazane)

A reactor placed in a constant-temperature bath at 60° C. was substituted with dry nitrogen, and then 3.0 liters of a pyridine solution containing the inorganic polysilazane obtained in Reference Example 1 was placed therein and kept until the temperature became constant, after which ammonia gas was injected in. The excess gas was released from a control valve to adjust the pressure in the reactor to 5 kg/cm$^2$ G, and this state was maintained for 14 hours.

After completion of the reaction, 3.5 liters of dry o-xylene was added thereto and dry nitrogen was blown in to remove the unreacted ammonia, after which the solvent was removed under reduced pressure to make a volume of about 3.5 liters, an additional 3.5 liters of dry oxylene was added thereto and distillation under reduced pressure was effected again to obtain 2.5 liters of the solution. A portion of the solution was separated off and the solvent was again removed under reduced pressure, upon which a white, solid silazane was obtained.

The molecular weight was determined by GPC, and the number average molecular weight (Mn) was found to be 2070.

Also, elemental analysis showed the compositional ratio of silicon/nitrogen to be 1.05.

Reference Example 3 (Method of preparing polyborosilazane)

A 500 ml portion of the inorganic polysilazane-containing pyridine solution obtained in Reference Example 1 (inorganic polysilazane concentration: 5.10 wt%) was placed in a 1.5 liter volume pressure-tight reaction container, 20.0 cc (0.175 mol) of trimethylborate was added thereto, and the reaction was conducted in a closed system at 160° C. for 3 hours while stirring. The pressure was raised to 1.0 kg/cm$^2$ during the reaction. The generated gas was determined by gas chromatography (GC) to be hydrogen and methane. After cooling to room temperature, 500 ml of dry o-xylene was added thereto and the solvent was removed at a pressure of 3–5 mmHg and a temperature of 50°–70° C., upon which 54.5 g of a white powder was obtained. This powder was soluble in toluene, tetrahydrofuran, chloroform and other organic solvents.

The number average molecular weight of the above polymer powder was determined by GPC, and found to be 1680.

Also, its composition was Si:42.4%, N:25.9%, C:8.8%, O:12.7%, B:7.0%, H:3.8%.

Reference Example 4 (Method of preparing random copolymeric silazane)

A reactor placed in a constant-temperature bath at 0° C. was substituted with dry nitrogen, and then 900 ml dry pyridine was placed therein and kept until the temperature became constant, after which 57.5 g of methyldichlorosilane (CH$_3$SiHCl$_2$) and 50.5 g of dichlorosilane (SiH$_2$Cl$_2$) were added thereto while stirring to form a complex mixture, resulting in a white solid adduct. The reaction mixture was cooled to 0° C., and 72 g of dry ammonia was blown therein while stirring.

After completion of the reaction, dry nitrogen was blown in to remove the unreacted ammonia, and then pressure filtration was performed in a nitrogen atmosphere to obtain 850 ml of a filtrate. To this filtrate was added 1000 ml of dry o-xylene and the solvent was removed under reduced pressure, upon which 39.2 g of a colorless, viscous liquid was obtained.

The number average molecular weight of this viscous liquid was determined by GPC to be 630.

Also, the elemental composition (wt%) of the above polymer was Si:54.4, N:23.8, O:3.0, C:12.9.

Reference Example 5 (Method of preparing carbon-coated silicon nitride fibers)

A xylene solution containing a modified polysilazane prepared by the same method as in Reference Example 2 was concentrated to a viscosity of 400 poise at 23° C.

This solution was used for dry spinning under conditions of a nozzle diameter of 0.1 mm, 250 holes, a discharge rate of 2.5 m/min and a drying temperature of 80° C., and after application of an oil solution it was wound at a rate of 90 m/min using a winder. A Nelson roller was then used for can coiling of multi plied fibers of 1000 filaments/strand from four 1000 m wound bobbins, in a basket.

The raw fibers were kept for one hour in ammonia at 600° C., with a temperature-elevating rate of 180° C./hour.

The ammonia-fired fibers were then wound on a bobbin and subjected to continuous firing in nitrogen. The continuous firing was carried out at a temperature-elevating rate of 20° C./min to a final temperature of 1300° C.

The resulting silicon nitride fibers had a tensile strength of 250 kgf/mm$^2$ and a tensile elasticity of 23 tonf/mm$^2$, and contained 2.7% oxygen and 0.2% carbon while having a stoichiometric silicon nitride composition.

The fibers were continuously treated at 1200° C. in a methane/hydrogen atmosphere to obtain a carbon coating 0.1 μm thick. There were no changes in the physical properties prior to the coating.

Example 1 (Production of a carbon fiber-type unidirectional reinforced composite material)

FT500 pitch-type CF fibers, product of Tonen Co. (tensile strength: 355 kgf/mm$^2$, tensile modulus: 57.3 tonf/mm$^2$, 3 K filaments/strand) were wound up on a metal plate 100 mm square and 10 mm thick so that the direction of the strands was uniform.

The fiber layer was sandwiched between metal plates and pressed to a thickness at which the gap ratio of the fiber preform became 50%. The first impregnation step was carried out while the fiber preform was sandwiched between the metal plates. As the impregnation solution there was used a mixed polysilazane (number average molecular weight: 1021, viscosity: 568 mPa.s at 25° C.) prepared by mixing the inorganic polysilazane in Reference Example 1 (A) above (number average molecular weight: 902, viscosity 75 mPa.s at 25° C.) with the modified polysilazane in Reference Example 2 (F) above (number average molecular weight: 2070, solid) at a weight ratio of 4:1.

(1) Impregnation step

A preform placed in a metal pressure vessel was subjected to vacuum treatment at 80° C., 10$^{-1}$ torr for one hour for deairing, after which the polymer was introduced therein and vacuum impregnation was performed. The pressure vessel was then pressurized with nitrogen gas to 5 kg/cm2.G and this state was maintained for one hour for pressure impregnation of the polymer.

(2) Crosslinking curing step

The temperature of the pressure container which had been pressurized to 5 kg/cm$^2$.G with nitrogen gas was raised at a temperature-elevating rate of 1° C./min to 200° C. and this state was maintained for one hour for crosslinking curing of the polymer. The pressure at this time was raised to 6.7 kg/cm$^2$.G.

(3) Firing step

The cured preform was taken out from the pressure vessel and fired to 1200° C. (temperature-elevating rate: 3° C./min, maintained for one hour) in a nitrogen atmosphere.

The resulting fired body had a porosity rate of 23%. The process of impregnation, crosslinking curing and firing was then repeated 5 times to obtain a fired body with a porosity of 7%.

The 3-point flexural strength of the fired body at normal temperature was determined based on JIS R1601 and found to be 89 kgf/mm$^2$. Also, only a graphite peak due to the carbon fiber was found in the powder X-ray diffraction pattern of the fired body, and the matrix was in an amorphous state.

Comparison Example 1 (Production of a carbon fiber-type unidirectional reinforced composite material)

A preform was prepared in the same manner as in Example 1, but using only the inorganic polysilazane in Reference Example 1.

Impregnation, crosslinking curing and firing were performed in the same manner as in Example 1, and the porosity of the resulting sintered body was 33%. Bubbling was observed in sections thereof, and traces of exuding of the polymer were found.

In the same manner as in Example 1, the process of impregnation, crosslinking curing and firing was then repeated 7 times to obtain a fired body with a porosity of 15%. The 3-point flexural strength of the fired body at normal temperature was determined based on JIS R1601 and found to be 72 kgf/mm$^2$. Also only a graphite peak due to the carbon fiber was found in the powder X-ray diffraction pattern of the fired body, and the matrix was in an amorphous state.

Example 2 (Production of a silicon carbide fiber-type unidirectional reinforced composite material)

Nicalon NL-607 carbon-coated silicon carbide-type fibers, product of Nihon Carbon Co. (tensile strength: 270 kgf/mm$^2$, tensile modulus: 19.2 tonf/mm$^2$, 0.5 K filaments/strand) were wound up on a metal plate 100 mm square and 10 mm thick so that the direction of the strands was uniform.

The fiber layer was sandwiched between metal plates and pressed to a thickness at which the gap ratio of the fiber preform became 45%. The first impregnation step was carried out while the fiber preform was sandwiched between the metal plates.

As the impregnation solution there was used a mixed polysilazane (number average molecular weight: 980, viscosity: 208 mPa.s at 25° C.) prepared by mixing the inorganic polysilazane in Reference Example 1 (A) above (number average molecular weight: 902, viscosity 75 mPa.s at 25° C.) with the polyborosilazane in Reference Example 3 (K) above (number average molecular weight: 1680, solid) at a weight ratio of 10:1.

The steps of impregnation and crosslinking curing were carried out as in Example 1, and the cured preform was fired to 1250° C. (temperature-elevating rate: 3° C./min, maintained for one hour) in a nitrogen atmosphere.

The resulting fired body had a porosity of 24%. The process of impregnation, crosslinking curing and firing was then repeated 5 times to obtain a fired body with a porosity of 7% and a $V_f$ of 40%. The 3-point flexural strength of the fired body at normal temperature was determined based on JIS R1601 and found to be 61 kgf/mm$^2$. Also, only a β-silicon carbide peak due to the silicon carbide fiber was found in the powder X-ray diffraction pattern of the fired body, and the matrix was in an amorphous state.

Comparison Example 2 (Production of a silicon carbide fiber-type unidirectional reinforced composite material)

Since the modified polysilazane in Reference Example 2 is a solid upon removal of the solvent, it must be diluted with an organic solvent. Dry xylene was added thereto for adjustment to 52 wt%. The viscosity of this solution was 105 mPa.s at 25° C.

Impregnation, crosslinking curing and firing were performed in the same manner as in Example 2, and the porosity of the resulting fired body was 38%.

In the same manner as in Example 2, the process of impregnation, crosslinking curing and firing was then repeated 7 times to obtain a fired body with a porosity of 21%. The 3-point flexural strength of the fired body at normal temperature was determined based on JIS R1601 and found to be 39 kgf/mm$^2$. Also, only a β-silicon carbide peak due to the silicon carbide fiber was found in the powder X-ray diffraction pattern of the fired body, and the matrix was amorphous.

Example 3 (Production of a silicon nitride fiber-type unidirectional reinforced composite material)

The Tonen carbon-coated silicon nitride fibers mentioned in Reference Example 5 (tensile strength: 250 kgf/mm$^2$, tensile modulus: 23 tonf/mm$^2$, 1K filaments/strand) were wound up on a metal plate 100 mm square and 10 mm thick so that the direction of the strands was uniform.

The fiber layer was sandwiched between metal plates and pressed to a thickness at which the gap ratio of the fiber preform became 50%. The first impregnation step was carried out while the fiber preform was sandwiched between the metal plates.

As the impregnation solution there was used a mixed polysilazane (number average molecular weight: 910, viscosity: 437 mPa.s at 25° C.) prepared by mixing the random copolymeric silazane mentioned in Reference Example 4 (number average molecular weight: 756, viscosity 55 mPa.s at 25° C.) with the polyborosilazane in K above (number average molecular weight: 1680, solid) at a weight ratio of 5:1.

The steps of impregnation and crosslinking curing were carried out as in Example 1, and the cured preform was fired to 1350° C. (temperature-elevating rate: 3° C./min, maintained for one hour) in a nitrogen atmosphere.

The resulting fired body had a porosity of 25%. The process of impregnation, crosslinking curing and firing was then repeated 7 times to obtain a sintered body with a porosity rate of 6% and a $V_f$ of 50%. The 3-point flexural strength of the sintered body at normal temperature was determined based on JIS R1601 and found to be 63 kgf/mm$^2$. Also, no evidence of crystallization was found in the powder X-ray diffraction pattern of the sintered body, and the matrix was in an amorphous state.

Example 4 (Production of carbon fiber-type 2D composite material)

A plain weave of FT500 pitch-type CF fibers, product of Tonen Co. (tensile strength: 355 kgf/mm$^2$, tensile modulus: 57.3 tonf/mm$^2$, 3 K filaments/strand) was cut into pieces 100 mm square, and one piece at a time was immersed in an impregnation solution and then pressed to a thickness of 5 mm with a gap ratio of 50%.

Impregnation, crosslinking curing and firing were performed in the same manner as in Example 1. The porosity of the resulting fired body was 27%.

The process of impregnation, crosslinking curing and firing was then repeated 5 times to obtain a sintered body with a porosity of 8%. The 3-point flexural strength of the sintered body at normal temperature was determined based on JIS R1601 and found to be 53 kgf/mm$^2$. Also, only a graphite peak due to the carbon fiber was found in the powder X-ray diffraction pattern of the sintered body.

Example 5 (Production of silicon carbide fiber-type bidirectional reinforced composite material)

A plain weave of Nicalon NL-607 silicon carbide-type fibers, product of Nihon Carbon Co. (tensile strength: 270 kgf/mm$^2$, tensile modulus: 19.2 tonf/mm$^2$, 0.5 K filaments/strand) was cut into pieces 100 mm square, and one piece at a time was immersed in an impregnation solution and then pressed to a thickness of 5 mm with a gap ratio of 50%.

Impregnation, crosslinking curing and firing were performed in the same manner as in Example 2.

The porosity rate of the resulting fired body was 29%. The process of impregnation, crosslinking curing and firing was then repeated 5 times to obtain a fired body with a porosity of 10%. The 3-point flexural strength of the fired body at normal temperature was determined based on JIS R1601 and found to be 41 kgf/mm$^2$. Also, only a β-silicon carbide peak due to the silicon carbide fiber was found in the powder X-ray diffraction pattern of the fired body, and the matrix was in an amorphous state.

Example 6 (Production of silicon nitride fiber-type bidirectional reinforced composite material)

A plain weave of the Tonen silicon nitride fibers mentioned in Reference Example 5 (tensile strength: 250 kgf/mm$^2$, tensile modulus: 23 tonf/mm$^2$, 1 K filaments/strand) was cut into pieces 100 mm square, and one piece at a time was immersed in an impregnation solution and then pressed to a thickness of 5 mm with a gap ratio of 50%.

Impregnation, crosslinking curing and firing were performed in the same manner as in Example 3. The porosity of the resulting fired body was 29%. The process of impregnation, crosslinking curing and firing was then repeated 5 times to obtain a fired body with a porosity rate of 7%. The 3-point flexural strength of the fired body at normal temperature was determined based on JIS R1601 and found to be 41 kgf/mm$^2$. Also, the powder X-ray diffraction pattern of the fired body showed an amorphous state.

Example 7 (Production of carbon fiber-type bidirectional reinforced composite material)

A plain weave of FT-500 pitch-type CF fibers, product of Tonen Co (tensile strength: 355 kgf/mm$^2$, tensile modulus: 57 3 tonf/mm$^2$, 3 K filaments/strand) was cut into pieces 100 mm square, and one piece at a time was immersed in an impregnation solution and then pressed to a thickness of 5 mm with a gap ratio of 50%.

SiC whiskers, product of Tokai Carbon Co. were adequately mixed with the same polymer mixture as in Example 1 to 30 wt% using a ball mill, and used for the first impregnation in the impregnation solution.

The process of crosslinking curing and firing followed by impregnation, crosslinking curing and firing 5 times was carried out in the same manner as in Example 4.

The final porosity of the fired body was 7%. The flexural strength of the fired body at normal temperature was determined based on JIS R1601 and found to be 59 kgf/mm$^2$. Also, only a graphite peak due to the carbon fibers and a silicon carbide peak due to the SiC whiskers were found in the powder X-ray diffraction pattern of the fired body.

Example 8 (Production of silicon carbide fiber-type bidirectional reinforced composite material)

A plain weave of Nicalon NL-607 silicon carbide-type fibers, product of Nihon Carbon Co. (tensile strength: 270 kgf/mm$^2$, tensile modulus: 19.2 tonf/mm$^2$, 0.5K filaments/strand) was cut into pieces 100 mm square, and one piece at a time was immersed in an impregnation solution and then pressed to a thickness of 5 mm with a gap ratio of 50%.

SN-E10 silicon nitride powder, product of Ube Kousan Co. were adequately mixed with the same polymer mixture as in Example 2 to 50 wt% using a ball mill, and used for the first impregnation in the impregnation solution.

The process of crosslinking curing and firing followed by impregnation, crosslinking curing and firing 5 times was carried out in the same manner as in Example 5.

The final porosity of the fired body was 8%. The flexural strength of the fired body at normal temperature was determined based on JIS R1601 and found to be 44 kgf/mm$^2$. Also, only a β-silicon carbide peak due to the silicon carbide fibers and an α-silicon nitride peak due to the silicon nitride powder were found in the powder X-ray diffraction pattern of the fired body, and the matrix was in an amorphous state.

Example 9 (Production of silicon nitride fiber-type bidirectional reinforced composite material)

A plain weave of the Tonen silicon nitride fibers mentioned in Reference Example 5 (tensile strength: 250 kgf/mm$^2$, tensile modulus: 23 tonf/mm$^2$, 1 K filaments/strand) was cut into pieces 100 mm square, and one piece at a time was immersed in an impregnation solution and then pressed to a thickness of 5 mm with a gap ratio of 50%.

B$_4$C powder, product of Herman C. Stark Co. was adequately mixed with the same polymer mixture as in Example 3 to 50 wt% using a ball mill, and used for the first impregnation in the impregnation solution.

The process of crosslinking curing and firing followed by impregnation, crosslinking curing and firing 5 times was carried out in the same manner as in Example 6.

The final porosity of the fired body was 6%. The 3-point flexural strength of the fired body at normal temperature was determined based on JIS R1601 and found to be 65 kgf/mm$^2$. Also, no peak was found in the powder X-ray diffraction pattern of the fired body other than that of B$_4$C, and the matrix was in an amorphous state.

Example 10 (High densification of reaction-sintered silicon nitride—impregnation of inorganic polysilazane)

As the impregnation solution there was used a mixed polysilazane (number average molecular weight: 1021, viscosity: 568 mPa.s at 25° C.) prepared by mixing the inorganic polysilazane in A (Reference Example 1) above (number average molecular weight: 902, viscosity 75 mPa.s at 25° C.) with the modified polysilazane in F (Reference Example 2) above (number average molecular weight: 2070, solid) at a weight ratio of 4:1.

Commercially available reaction-bonded silicon nitride (porosity 19%) was cut out to a size of 50×60× 5 mm and used as the porous body.

The densified body was prepared by the following steps.

(1) Impregnation step

The porous body placed in a metal pressure vessel was subjected to vacuum treatment at 80° C., 10$^{-1}$ torr for one hour for deairing, after which the polymer was introduced therein and vacuum impregnation was performed. The pressure vessel was then pressurized with nitrogen gas to 5 kg/cm$^2$.G and this state was maintained for one hour for pressure impregnation of the polymer.

(2) Crosslinking curing step

The temperature of the pressure container which had been pressurized to 5 kg/cm$^2$.G with nitrogen gas was raised to 200° C. at a temperature-elevating rate of 1° C./min and this state was maintained for one hour for crosslinking curing of the polymer. The pressure at this time was raised to 6.7 kg/cm².G.

(3) Firing step

The cured porous body was taken out from the pressure vessel and fired to 1200° C. (temperature-elevating rate: 3° C./min, maintained for one hour) in a nitrogen atmosphere.

The resulting fired body had a porosity of 9%. The process of impregnation, crosslinking curing and firing was then repeated 4 times to obtain a fired body with a porosity rate of 3%. The 3-point flexural strength of the fired body at normal temperature was determined based on JIS R1601 and found to be 59 kgf/mm², which was a major improvement in the mechanical properties in comparison with the 37 kgf/mm² for the non-impregnated reaction-bonded silicon nitride specimen prepared as a comparison material, and thus an effect of consolidation by the polysilazane was confirmed.

Comparison Example 3 (High densification of reaction-sintered silicon nitride—impregnation of modified polysilazane)

Since the modified polysilazane in F (Reference Example 2) above is a solid upon removal of the solvent, it must be diluted with an organic solvent. The solvent was removed using an evaporator, and dry o-xylene was added thereto for adjustment to 52 wt%. The viscosity of this solution was 105 mPa.s at 25° C.

The same reaction-bonded silicon nitride as in Example 10 was used as the porous body.

Impregnation, crosslinking curing and firing were performed in the same manner as in Example 10, and the porosity rate of the resulting fired body was 14%.

In the same manner as in Example 10, the process of impregnation, crosslinking curing and firing was then repeated 4 times to obtain a fired body with a porosity rate of 10%. The 3-point flexural strength of the fired body at normal temperature was determined based on JIS R1601 and found to be 47 kgf/mm².

Example 11 (Production of boron nitride (BN) / inorganic polysilazane composite material)

A commercially available BN sintered body (porosity: 25%, binder-free high-purity type) cut out to 50 mm × 60 mm × 5 mm thickness was used.

As the impregnation solution there was used a mixed polysilazane (number average molecular weight: 910, viscosity: 437 mPa.s at 25° C.) prepared by mixing the random copolymeric silazane in Reference Example 4 (D) above (number average molecular weight: 756, viscosity 55 mPa.s at 25° C.) with the polysilazane in Reference Example 3 (K) above (number average molecular weight: 1680, solid) at a weight ratio of 5:1.

The steps of impregnation and crosslinking curing were carried out as in Example 10, and the cured ceramic was fired to 1350° C. (temperature-elevating rate: 3° C./min, maintained for one hour) in a nitrogen atmosphere.

The resulting fired body had a porosity of 10%. The process of impregnation, crosslinking curing and firing was then repeated 5 times to obtain a sintered body with a porosity rate of 4%. The 3-point flexural strength of the sintered body at normal temperature was determined based on JIS R1601 and found to be 19 kgf/mm², which was a major improvement in comparison with the 6 kgf/mm² for the non-impregnated BN sintered body.

Reference Example 6 (Method for producing carbon-coated silicon nitride fiber plain weave)

A xylene solution containing a modified polysilazane prepared by the same method as in Reference Example 2 was concentrated to a viscosity of 400 poise at 23° C.

This solution was used for dry spinning under conditions of a nozzle diameter of 0.1 mm, 250 holes, a discharge rate of 2.5 m/min and a drying temperature of 80° C., and after application of an oil solution it was wound at a rate of 90 m/min using a winder. A Nelson roller was then used for can coiling of multi plied fibers of 1000 filaments/strand from four 1000 m wound bobbins, in a basket.

The raw fibers were kept for one hour in ammonia at 600° C., with a temperature-elevating rate of 180° C./hour.

The ammonia-fired fibers were then wound on a bobbin and subjected to continuous firing in nitrogen. The continuous firing was carried out at a temperature-elevating rate of 20° C./min to a final temperature of 1300° C.

The resulting silicon nitride fibers had a tensile strength of 250 kgf/mm² and a tensile elasticity of 23 tonf/mm², and contained 2.7% oxygen and 0.2% carbon while having a stoichiometric silicon nitride composition.

The fibers were continuously treated at 1200° C. in a methane/hydrogen atmosphere to obtain a carbon coating 0.1 μm thick. There were no changes in the physical properties prior to the coating.

Using these carbon-coated silicon nitride fibers, plain weaving was performed with a count of 6 strands/cm for both warp and weft, to obtain a plain weave.

Example 12 (Production of silicon carbide fiber-type bidirectional reinforced composite material)

A plain weave of Nicalon silicon carbide-type fibers, product of Nihon Carbon Co. (NL-207, tensile strength: 290 kgf/mm², tensile modulus: 19 tonf/mm², 0.5 K filaments/strand) was cut into pieces 100 mm square and laminated, and then impregnation, curing and carbonization were carried out using an epoxy resin to obtain preforms 3 mm thick with a porosity of 58%.

Next, CVD coating was performed under conditions to deposit silicon carbide on the surface of the pores, and 62% of the pores were filled (porosity rate: 22%).

As the impregnation solution for impregnation into the CVD preforms there was used a mixed polysilazane (number average molecular weight: 1021, viscosity: 568 mPa.s at 25° C.) prepared by mixing the inorganic polysilazane in Reference Example 1 (A) above (number average molecular weight: 902, viscosity: 75 mPa.s at 25° C.) with the modified polysilazane in Reference Example 2(F) above (number average molecular weight: 2070, solid) at a weight ratio of 4:1, and composite bodies were obtained by the following steps.

(1) Impregnation step

A preform placed in a metal pressure vessel was subjected to vacuum treatment at 80° C., $10^{-1}$ torr for one hour for deairing, after which the polymer was introduced therein and vacuum impregnation was performed. The pressure vessel was then pressurized with nitrogen gas to 5 kg/cm2.G and this state was maintained for one hour for pressure impregnation of the polymer.

(2) Crosslinking curing step

The temperature of the pressure container which had been pressurized to 5 kg/cm2.G with nitrogen gas was raised to 200° C. at a temperature-elevating rate of 1° C./min and this state was maintained for one hour for crosslinking curing of the polymer. The pressure at this time was raised to 6.7 kg/cm2.G.

(3) Firing step

The cured preform was taken out from the pressure vessel and fired to 1250° C. (temperature-elevating rate: 3° C./min, maintained for one hour) in a nitrogen atmosphere.

The resulting fired body had a porosity of 16%. The process of impregnation, crosslinking curing and firing was then repeated 6 times to obtain a fired body with a porosity rate of 3%.

When the 3-point flexural strengths of each of the fired bodies at normal temperature were determined, an average strength of 370 MPa was obtained. Also, the rupturing was in a pseudo-plastic manner, and no delamination was observed.

Comparison Example 4

When the 3-point flexural strength at normal temperature was determined for a CVD preform obtained in the same manner as in Example 12, an average strength of 275 MPa was obtained. The rupturing was in a pseudo-plastic manner, and no delamination was observed, but since the high-densification was insufficient there was some rupture due to local warping.

Comparison Example 5

A plain weave of silicon carbide-type fibers, product of Nihon Carbon Co. (NL-607, tensile strength: 270 kgf/mm$^2$, tensile modulus: 19 tonf/mm$^2$, 0.5 K filaments/strand) was cut into pieces 100 mm square, and one piece at a time was immersed in an impregnation solution and then pressed to a thickness of 4 mm with a gap ratio of 60%.

Impregnation, curing and firing were performed in the same manner as in Example 12, and finally fired bodies with a porosity of 6% were obtained. The 3-point flexural strength of these fired bodies at normal temperature was an average of 310 MPa.

The rupturing was in a pseudo-plastic manner, but partial delamination was observed. Furthermore, since the high-densification was sufficient no rupture due to warping was observed.

Examples 13 and 14 (Production of silicon carbide-type bidirectional reinforced composite material)

A composite material was produced using the same reinforced fibers, CVD coating and impregnation polymer as in Example 12.

The following shows the results of varying the amount of silicon carbide deposited inside the pores by CVD coating.

Example 15 (Production of silicon carbide-type bidirectional reinforced composite material)

A plain weave of silicon carbide-type fibers Tyranno, product of Ube Kousan Co. (Lox M, tensile strength: 330 kgf/mm, tensile modulus: 19 ton/mm$^2$, 0.8 K filaments/strand) was cut into a piece 100 mm square and laminated, and then impregnation, curing and carbonization were carried out using a phenol resin to obtain a preform 3 mm thick with a porosity of 58%.

Next, CVD coating was performed under conditions to deposit silicon carbide on the surface of pores, and 50% of the pores were filled (porosity: 29%).

As the impregnation solution there was used a mixed polysilazane (number average molecular weight: 910, viscosity: 437 mPa.s at 25° C.) prepared by mixing the random copolymeric silazane in Reference Example 4 above (number average molecular weight: 756, viscosity 55 mPa.s at 25° C.) with the polyborosilazane in Reference Example 3 (K) above (number average molecular weight: 1680, solid) at a weight ratio of 5:1.

The impregnation was carried out as in Example 12, and the preform cured in the same manner as in Example 12, except for a curing temperature of 250° C., was fired to 1350° C. (temperature-elevating rate: 3° C./min, maintained for 15 minutes) in a nitrogen atmosphere.

The resulting fired body had a porosity of 20%. The process of impregnation, crosslinking curing and firing was then repeated 6 times to obtain a sintered body with a porosity rate of 4%. The 3-point flexural strength of the fired body at normal temperature was determined based on JIS R1601 and found to be 430 MPa. Also, no evidence of crystallization was found in the powder X-ray diffraction pattern of the fired body, and the matrix was in an amorphous state.

Comparison Example 6

When the 3-point flexural strength at normal temperature was determined for CVD preforms obtained in the same manner as in Example 15, an average strength of 230 MPa was obtained.

The rupturing was in a pseudo-plastic manner, and no delamination was observed, but since the high-densification was insufficient there was some rupture due to local warping.

Example 16 (Production of carbon fiber-type bidirectional reinforced composite material)

A plain weave of FT-500 pitch-type CF fibers, product of Tonen Co. (tensile strength: 355 kgf/mm$^2$, tensile modulus: 57.3 tonf/mm$^2$, 3 K filaments/strand) was cut into a piece 100 mm square and laminated, and then impregnation,

|  | Porosity of preform prior to CVD (%) | Porosity of preform after CVD (%) | Strength of preform after CVD (MPa) | Strength of fired body after impregnation, curing, firing (MPa) | Porosity of fired body (%) | Delamination | Rupture due to warping |
|---|---|---|---|---|---|---|---|
| Example 13 | 56 | 49 | Unmeasurable | 320 | 5 | Practically none | None |
| Example 14 | 61 | 13 | 250 | 340 | 3 | None | None | curing and carbonization were carried out using an epoxy resin to obtain a preform 3 mm thick with a porosity of 50%.

Next, CVD coating was performed under conditions to deposit silicon carbide on the surface of pores, and 60% of the pores were filled (porosity: 20%). Then, the mixed polysilazane mentioned in Example 15 was used as the solution for impregnation into the preform, and the process of impregnation, crosslinking curing and firing was then repeated 7 times under the same conditions to obtain a fired body with a porosity of 5%. The 3-point flexural strength of the fired body at normal temperature was determined and found to be 430 MPa. The rupturing was in a pseudo-plastic manner, and no delamination was observed.

Comparison Example 7

The same type of plain weave as in Example 16 was cut out to pieces 100 mm square, and one piece at a time was immersed in an impregnation solution and then pressed to a thickness of 4 mm with a gap ratio of 50%.

The steps for the impregnation polymer, impregnation, crosslinking curing and firing were carried out in the same manner as in Example 16, to obtain a fired body with a porosity of 7%.

When the 3-point flexural strengths at normal temperature were determined for these fired bodies, an average strength of 400 MPa was obtained. The rupturing was in a pseudo-plastic manner, and partial delamination was observed.

Example 17

Preforms made of a 2D Nicalon silicon carbide fiber-reinforced silicon carbide composite material commercially available from DuPont Co. (After densification in pores by CVI: $V_f=40\%$, gap ratio=28%) were subjected to impregnation, crosslinking curing and firing in the same manner as in Example 15. As a result there were obtained fired bodies with a porosity of 7%. When the 3-point flexural strengths at normal temperature were determined for these fired bodies, an average strength of 410 MPa was obtained.

The strength was high compared with the strength of 290 MPa of the CVD preform alone, and no rupturing, etc. due to delamination or warping was observed.

Example 18

The plain weave of carbon-coated Tonen silicon nitride fibers described in Reference Example 6 (tensile strength: 250 kgf/mm², tensile modulus: 23 tonf/mm², 1 K filaments/strand) was cut into pieces 100 mm square, and then impregnation, curing and carbonization were carried out using an epoxy resin to obtain preforms 3 mm thick with a porosity of 49%.

Next, CVD coating was performed under conditions to deposit silicon carbide on the surface of pores, and 45% of the pores were filled (porosity: 23%). Then, the mixed polysilazane described in Example 16 was used as the solution for impregnation into the preforms, and the process of impregnation, crosslinking curing and firing was repeated once under the same conditions to obtain fired bodies with a porosity rate of 4%. The 3-point flexural strength of the fired bodies at normal temperature was an average of 470 MPa.

The rupturing was in a pseudo-plastic manner, and no rupturing, etc. due to delamination or warping was observed.

Reference Example 7 (Method for producing carbon-coated silicon nitride fibers)

A xylene solution containing polyborosilazane prepared by the same method as in Reference Example 3 was concentrated to a viscosity of 430 poise at 23° C. This solution was used for spinning and fiber multi plying in the same manner as in Reference Example 5. The temperature of the raw fibers was then raised by 180° C./hr, and they were kept in nitrogen at 800° C. for one hour. The fibers were then wound on a bobbin and subjected to continuous firing in nitrogen. The continuous firing was carried out at a temperature-elevating rate of 20° C./min to a final temperature of 1500° C. The resulting silicon nitride fibers had a tensile strength of 250 kgf/mm² and a tensile modulus of 26 tonf/mm², and contained 7.0% oxygen, 5.1% carbon, 5.2% boron, 34.5% nitrogen and 48.2% silicon.

The fibers were continuously treated at 1200° C. in a methane/silicon tetrachloride/nitrogen atmosphere to obtain a carbon coating 0.1 μm thick. There were no changes in the physical properties prior to the coating.

Example 19 (Carbon-coated silicon nitride fiber-reinforced composite material with 0°/90° lamination)

The carbon-coated silicon nitride fibers described in Reference Example 7 were passed through a slurry solution prepared by two-fold addition by weight of silicon nitride powder (SNE-10), product of Ube Kousan Co., to the impregnation solution described in Example 3 in a xylene solvent at a concentration of 80%, and were wound up on a mandrel with an outer circumference of 1000 mm to a width of 250 mm. After removal of the solvent, a pre-preg was prepared with a heated roll at 60° C. and cut out to pieces 100 mm square and laminated. The lamination was an 8-layer lamination in a lamination order of $(0°/90°/90°/0°)_2$. This pre-preg was placed in a vacuum bagging container and then kept for one hour in a pressure vessel which had been subjected to vacuum treatment at 100° C. for one hour and then pressurized with nitrogen gas to 5 kg/cm².G and kept for one hour, after which the temperature was raised to 250° C. at a rate of 1° C./min for crosslinking curing of the polymer. The pressure at this time was raised to 7.0 kg/cm2.G.

The cured preform was taken out of the pressure vessel and fired to 1350° C. (temperature-elevating rate: 3° C./min, maintained for 15 minutes) in a nitrogen atmosphere. The impregnation solution described in Example 3 was vacuum impregnated at 80° C. into the resulting fired bodies. The specimens were then placed in a vacuum bagging container and subjected to crosslinking curing and firing under the above conditions. This procedure was repeated 5 times to obtain a fired body with a porosity of 4%. The flexural strength of the fired bodies at normal temperature was an average of 550 MPa ($V_f=0.57$).

Example 20 (Production of silicon carbide fiber-type bidirectional reinforced composite material)

A plain weave of High Nicalon carbon-coated silicon carbide-type fibers, product of Nihon Carbon Co. (HJ-NL, tensile strength: 270 kgf/mm², tensile modulus: 27 tonf/mm², 0.5 K filaments/strand) was cut into pieces 100 mm square, and one piece at a time was immersed in an impregnation solution and then pressed to a thickness of 4 mm with a porosity of 50%.

SN-E10 silicon nitride powder, product of Ube Kousan Co. were adequately mixed with the same polymer mixture as in Example 3 to 50 wt% using a ball mill, and used for the first impregnation in the impregnation solution.

The process of crosslinking curing and firing followed by impregnation, crosslinking curing and firing 6 times was carried out in the same manner as in Example 15.

The final porosity of each of the sintered bodies was 7%. The 3-point flexural strength of the sintered body at normal temperature was 450 MPa. Also, only a β-silicon carbide peak due to the silicon carbide fibers and an α-silicon nitride peak due to the silicon nitride powder were found in the powder X-ray diffraction pattern of the fired body, and the matrix was in an amorphous state.

The present invention provides fiber reinforced ceramics and ceramic bodies with excellent heat resistance and corrosion resistance, as well as high density, high strength and high reliability, and it is thus expected to be applicable to various fields including aerospace technology, gas turbines, munitions, and the like.

We claim:

1. A method for producing ceramic products, characterized by comprising impregnating a metal fiber or ceramic fiber preform or porous ceramic with (3) a mixture of polysilazane polymers with a number average molecular weight of 200–3000 and a viscosity adjusted to 100 Pa.s or lower at the impregnation temperature, said mixture of polymers being prepared by mixing (1) one or more polysilazane polymers with a number average molecular weight of 200–3000 and a viscosity of less than 1 Pa.s at the impregnation temperature with (2) one or more polysilazane polymers with a number average molecular weight of 200–100,000 and having a viscosity of 1Pa.s or higher or solid at the impregnation temperature, said polymers (1) and (2) being selected from A–P below, and performing crosslinking curing and then firing the mixture of polymers for its conversion into a ceramic:

A) A polysilazane whose main repeating unit is —[(SiH$_2$)$_n$(NH)$_r$]— (where n and r are 1, 2 or 3);

B) A polysilazane whose main repeating units are —[(SiH$_2$)$_n$(NH)$_r$]— and —[(SiH$_2$)$_m$O]— (where n, m and r are 1, 2 or 3);

C) A polyorgano(hydro)silazane represented by the compositional formula (RSiHNH)$_x$ [(RSiH)$_{1.5}$N]$_{1-x}$ (where each R independently represents an alkyl, alkenyl, cycloalkyl, aryl, alkylsilyl, alkylamino, alkylhydrazine or alkoxy group, and 0.4<x<1);

D) A polysilazane whose main repeating units are —[(SiH$_2$)$_n$(NH)$_r$]— and [(SiR'H)$_n$(NR')$_r$]— (where R' may be the same or different and is a hydrogen atom or the same as R above, and n and r are 1, 2 or 3);

E) A polysilazane whose main repeating units are —SiH(N<)$_2$— and [(SiR'H)$_n$(NR')$_r$]— (where R' may be the same or different and is a hydrogen atom or the same as R above, and n and r are 1, 2 or 3);

F) A modified polysilazane obtained by reacting the polysilazane in A above with an alkylamine, alkylsilazane or alkylaminosilane represented by (R$^1$)$_2$NH [where each R$^1$ is independently an alkyl group or (R$^2$)$_3$Si— (where each R$^2$ is independently an alkyl group or hydrogen, provided that at least one is not hydrogen)];

G) A modified polysilazane obtained by reacting the polysilazane in A above with an alcohol, organic acid, ester, ketone, aldehyde, isocyanate, amide or mercaptan;

H) A silazane high polymer obtained by further crosslinking and branching the polysilazane in A above, wherein the ratio of —SiH$_2$ groups to —SiH$_3$ groups per molecule is 2.5–8.4;

I) A polymetallosilazane obtained by reacting a polysilazane whose main repeating unit is represented by —Si(R$^3$)$_2$NR$^3$— (where each R$^3$ is independently a hydrogen atom or the same as R above, provided that at least one R$^3$ is hydrogen), with a metal alkoxide represented by M(OR$^4$)$_m$ (where M is an element selected from the group consisting of elements from Groups IIA to VA and elements from Groups IIB to VB of the Periodic Table, each R$^4$ independently represents a hydrogen atom, an alkyl group of 1–20 carbon atoms or an aryl group provided that at least one R$^4$ is not a hydrogen atom, and m is the valency of M.);

J) A polyborosilazane whose main repeating units are —[(SiH$_2$)$_n$(NH)$_r$]— (where n and r are 1, 2 or 3) and —B(N<)$_2$;

K) A polyborosilazane whose main repeating unit is represented by —Si(R$^3$)$_2$NR$^3$— (where R$^3$ is the same as above), and which has a crosslinked bond

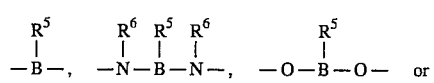, 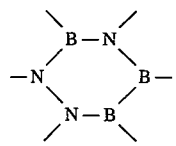 or (where each R$^5$ is independently a hydrogen atom, halogen atom or a C$_1$ to C$_{20}$ alkyl, alkenyl, cycloalkyl, aryl, alkoxy, alkylamino, hydroxyl or amino group, R$^6$ is a residue bonded to the nitrogen atom of a nitrogen atom-containing R$^5$ group, and in the last chemical formula at least 2 of the total of 6 atoms consisting of 3 nitrogen atoms and 3 boron atoms are used for crosslinking, while R$^5$ may be bonded to the remaining atoms);

L) A polyphosphosilazane whose main repeating unit is represented by —Si(R$^3$)$_2$NR$^3$— (where R$^3$ is the same as above), and which has a crosslinked bond

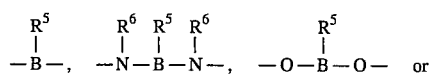, 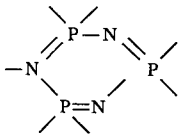 or (where R$^5$ is the same as described above, R$^6$ is a residue bonded to the nitrogen atom of a nitrogen atom-containing R$^5$ group, and in the last chemical formula at least 2 of the bonding sites are used for crosslinking, while R$^5$ may be bonded to the remaining atoms);

M) A thermosetting copolymer prepared by copolymerizing a polysilazane whose main repeating unit is —[(SiH$_2$)$_n$(NH)$_r$]— (where n and r are 1, 2 or 3) with a thermoplastic silicon-containing polymer;

N) A thermosetting copolymer prepared by copolymerizing the reaction product of a polysilazane whose main repeating unit is —[(SiH$_2$)$_n$(NH)$_r$]— (where n and r are 1, 2 or 3) and a metal compound, with a thermoplastic silicon-containing polymer;

O) A thermosetting copolymer prepared by copolymerizing the polyborosilazane described in I, J or K above with a thermoplastic silicon-containing polymer;

P) A copolymer of any of the above mentioned polymers.

2. A method for producing ceramic products, characterized by comprising impregnating a metal fiber or ceramic fiber preform or porous ceramic with a substance combined with one or more polysilalane polymers according to claim 1 selected from polymers A–P, with a number average molecular weight of 200–3000 and a viscosity of 100 Pa.s or lower at the impregnation temperature, and performing crosslinking curing and then firing for its conversion into a ceramic.

3. A method for producing ceramic products according to claim 2, characterized by further comprising a step of CVD coating of the surface of the pores of said preform or porous ceramic.

4. A method for producing ceramic products according to claim 3, wherein said CVD coating step is performed before and/or after said steps of impregnation, curing and firing.

5. A method for producing ceramic products according to claim 3, wherein the depositing capacity of the above mentioned CVD coating on the preform or porous ceramic is 2–80% based on the total porous volume.

6. A method for producing ceramic products according to claim 3, wherein said CVD is low pressure, normal pressure or intermittent thermal CVD, plasma CVD or photo CVD.

7. A method for producing ceramic products according to claim 2, which is carried out by repeating said impregnation, crosslinking curing and firing process two or more times.

8. A method for producing ceramic products according to claim 1 characterized by further comprising a step of CVD coating of the surface of the pores of said preform or porous ceramic.

9. A method for producing ceramic products according to claim 8, wherein said CVD coating step is performed before and/or after said steps of impregnation, curing and firing.

10. A method for producing ceramic products according to claim 8, wherein the depositing capacity of the above mentioned CVD coating on the preform or porous ceramic is 2–80% based on the total porous volume.

11. A method for producing ceramic products according to claim 8, wherein said CVD is low pressure, normal pressure or intermittent thermal CVD, plasma CVD or photo CVD.

12. A method for producing ceramic products according to claim 1, which is carried out by repeating said impregnation, crosslinking curing and firing process two or more times.

* * * * *